Aug. 17, 1943.    H. A. REIMERS    2,327,065
WELDING FLUX FOR MAGNESIUM BASE ALLOYS
Filed Aug. 30, 1941
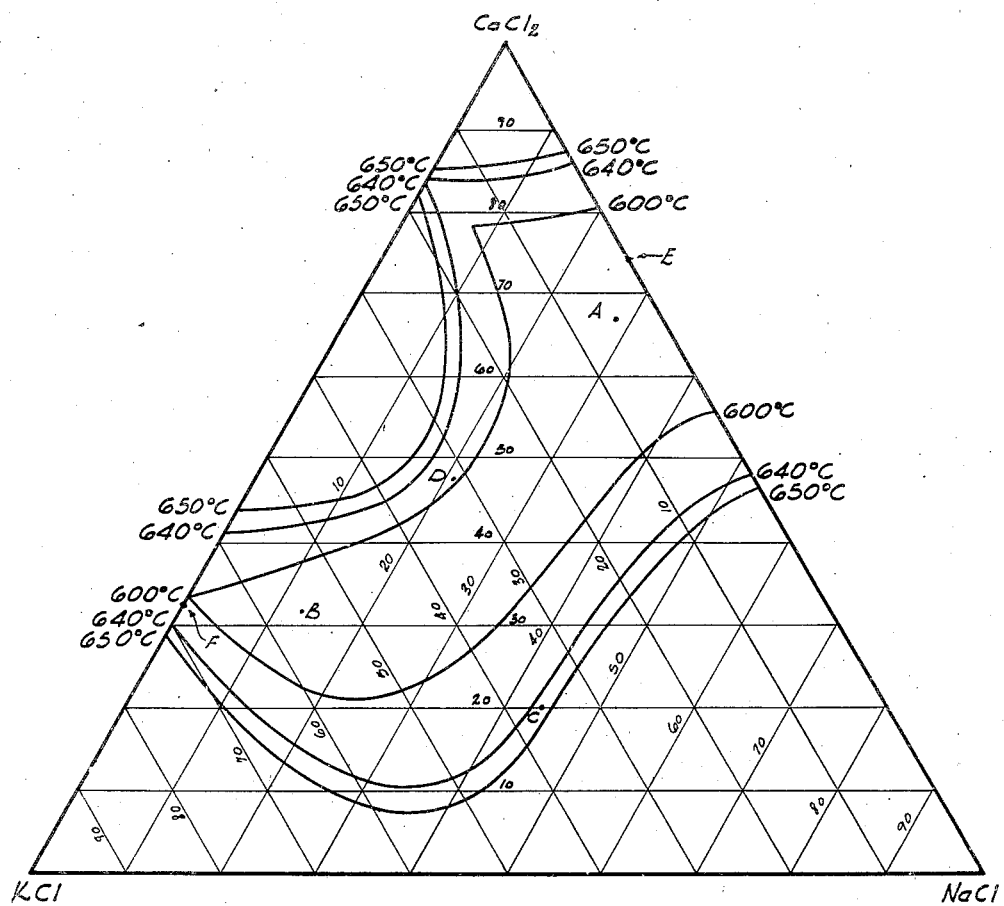
INVENTOR.
Hans. A. Reimers
BY
Griswold & Burdick
ATTORNEYS Patented Aug. 17, 1943

2,327,065

UNITED STATES PATENT OFFICE 2,327,065

WELDING FLUX FOR MAGNESIUM BASE ALLOYS

Hans A. Reimers, Midland, Mich., assignor to The Dow Chemical Company, Midland, Mich., a corporation of Michigan Application August 30, 1941, Serial No. 409,043

3 Claims. (Cl. 148—26)

This invention concerns the welding of magnesium base alloys and particularly concerns certain flux compositions comprising a fluoride, calcium chloride, and at least one of the compounds sodium chloride and potassium chloride.

Magnesium base alloys are experiencing a greatly increasing application to industry, particularly the airplane industry. With this development there has occurred the problem of providing suitable fluxes for improving the welding of these alloys, both from the standpoint of strength and appearance of the finished weld and the facility of handling the flux itself.

There are several important characteristics by which the value of welding fluxes for magnesium base alloys must be measured. The flux should be capable of being applied as a dry powder, as a core of the welding rod, or as a paste and should be easily removable from the completed weld as, for example, by wire brushing or washing. It should not embed itself in the metal, since this causes porosity and pitting, which in turn impairs the strength of the weld. The molten flux should flow over and around the molten metal to protect it from oxidation. It should not be reactive with the metal to the extent of impairing the strength of the finished weld. The presence of heavy metal salts should be avoided, since they spoil the various surface treating solutions used to treat the finished welded article and tend to be reduced by the molten magnesium, leaving a residue of metallic impurities in the weld.

I have now found that certain compositions comprising a fluoride, calcium chloride, and at least one member of the group consisting of sodium chloride and potassium chloride have the above characteristics and are suitable as welding fluxes for magnesium base alloys. The compositions may be defined by the melting point of the $CaCl_2$—NaCl—KCl mixture which, together with the fluoride, makes up the composition. The improved compositions are those containing a fluoride in an effective proportion not exceeding 10 per cent by weight, calcium chloride, and at least one member of the group consisting of sodium chloride and potassium chloride, wherein the $CaCl_2$—NaCl—KCl mixture. has a melting point below 650° C. Although these compositions produce good results and constitute a definition of the broad scope of the invention, compositions wherein the $CaCl_2$—NaCl—KCl mixture has a melting point of less than 640° C., and especially below 600° C., are preferred.

Mixtures of calcium chloride, sodium chloride, and potassium chloride which have a melting point below 650° C., 640° C., and 600° C., respectively, may readily be determined by a triangular co-ordinate graph showing the 650° C., 640° C., and 600° C. isotherms of this ternary mixture. This graph in mol per cent appears in the International Critical Tables, vol. 4, page 81.

The annexed drawing is a reproduction of the $CaCl_2$—NaCl—KCl ternary in weight per cent showing the 650° C., 640° C., and 600° C. isotherms. The lettered points indicate the location of the particular $CaCl_2$—NaCl—KCl mixtures used in the following examples, said examples being illustrative of the flux compositions of my invention.

Example A

| | | |
|---|---|---|
| Sodium fluoride | per cent | 2 |
| Calcium chloride, 67% | | |
| Sodium chloride, 28% | do | 98 |
| Potassium chloride, 5% | | |
| Melting point of the $CaCl_2$—NaCl—KCl mixture | °C | 504 |

Example B

| | | |
|---|---|---|
| Potassium fluoride | per cent | 5 |
| Calcium chloride, 31.6% | | |
| Sodium chloride, 12.6% | do | 95 |
| Potassium chloride, 55.8% | | |
| Melting point of the $CaCl_2$—NaCl—KCl mixture | °C | 570 |

Example C

| | | |
|---|---|---|
| Sodium fluoride | per cent | 6 |
| Calcium chloride, 20% | | |
| Sodium chloride, 44% | do | 94 |
| Potassium chloride, 36% | | |
| Melting point of the $CaCl_2$—NaCl—KCl mixture | °C | 645 |

Example D

| | | |
|---|---|---|
| Sodium fluoride | per cent | 8 |
| Calcium chloride, 47% | | |
| Sodium chloride, 21% | do | 92 |
| Potassium chloride, 32% | | |
| Melting point of the $CaCl_2$—NaCl—KCl mixture | °C | 603 |

Example E

| | | |
|---|---|---|
| Calcium fluoride | per cent | 5 |
| Calcium chloride, 74% | do | 95 |
| Sodium chloride, 26% | | |
| Melting point of the $CaCl_2$—NaCl mixture | °C | 548 |

Example F

| | | |
|---|---|---|
| Beryllium fluoride | per cent | 4 |
| Calcium chloride, 32% | do | 96 |
| Potassium chloride, 68% | | |
| Melting point of the $CaCl_2$—KCl mixture | °C | 615 |

The fluoride percentages are in all cases given on the basis of the total composition, whereas the calcium chloride, sodium chloride, and potassium chloride percentages refer to just the mixture of these three. As indicated above, this has been found most advantageous, since with amounts of fluoride less than 10 per cent, it is the melting point of the CaCl₂—NaCl—KCl mixture alone which determines the relative percentages of these three compounds to be used.

An effective proportion of fluoride refers to the activity of the fluoride as a coalescing agent for the molten metal. Such effective proportion is preferably in the range of 2–6 per cent by weight, but percentages as low as one-half per cent have been found sufficiently effective for practical use. The CaCl₂—NaCl—KCl mixture in the absence of fluoride prevents, or at least does not cause, coalescence of the molten metal. The use of fluorides in a proportion in excess of 10 per cent causes the production of spongy welds. Furthermore, more than 10 per cent of a fluoride raises the melting point of the composition to such an extent that suitable compositions can no longer be defined by the melting point of the $$CaCl_2—NaCl—KCl$$

mixture.

Sodium fluoride is the preferred fluoride but others which may be used are cryolite and the fluorides of potassium, magnesium, calcium, barium, aluminum, beryllium, and strontium. Lithium fluoride may be used, but it is inferior to the others, since it has some reactivity toward the magnesium, tends to cause pitting, and has a tendency to burn in the oxyhydrogen flame.

The flux compositions may be prepared by mixing the dry powders, by fusing the salts together and grinding, or by making a liquid paste. It is desirable to grind the powders together in a ball mill to assure adequate mixing. Enough powder to flux the weld satisfactorily may be obtained by dipping the hot welding rod into the mixed powders. When a paste is desired, a small amount of water, alcohol, or oil is stirred into the powder. The paste can be applied to the welding rod or to the seat of the weld by means of a brush. Of the liquids used in the paste, alcohol results in the best weld but causes difficulty in getting sufficient flux on the rod or weld metal.

Whether the flux is prepared and applied by these methods or by other methods which will be apparent to those skilled in the art, I have found that the flux compositions of the present invention possess the characteristics necessary for easy preparation, for easy application, and for the production of strong welds of good appearance.

I claim:

1. In a method of welding magnesium-base alloys, the improvement which consists in maintaining as a protective coating over the molten metal during welding a flux which consists of (a) a mixture of calcium chloride with at least one member of the group consisting of sodium chloride and potassium chloride, the ingredients of said chloride mixture being present in such relative proportions that the mixture has a melting point less than 650° C., and (b) a fluoride in a proportion representing between about 0.5 and about 10 per cent by weight of the total composition, said flux being substantially free of heavy metal salts.

2. In a method of welding magnesium-base alloys, the improvement which consists in maintaining as a protective coating over the molten metal during welding a flux which consists of (a) a mixture of calcium chloride with at least one member of the group consisting of sodium chloride and potassium chloride, the ingredients of said chloride mixture being present in such relative proportions that the mixture has a melting point less than 600° C., and (b) a fluoride selected from the class consisting of the fluorides of sodium, potassium, magnesium, calcium, barium, aluminum, beryllium, and strontium in a proportion representing between about 2 and about 6 per cent by weight of the total composition, said flux being substantially free of heavy metal salts.

3. In a method of welding magnesium-base alloys, the improvement which consists in maintaining as a protective coating over the molten metal during welding a flux which consists of (a) between 94 and 98 per cent by weight of a mixture of calcium chloride with at least one member of the group consisting of sodium chloride and potassium chloride, the ingredients of said chloride mixture being present in such relative proportions that the mixture has a melting point less than 650° C., and (b) between 2 and 6 per cent by weight of sodium fluoride, said flux being substantially free of heavy metal salts.

HANS A. REIMERS.